US010235319B2

(12) United States Patent
Lin (10) Patent No.: US 10,235,319 B2
(45) Date of Patent: Mar. 19, 2019

(54) METHOD AND APPARATUS FOR GROUPING MULTIPLE SAS EXPANDERS TO FORM A SINGLE COHESIVE SAS EXPANDER

(71) Applicant: Microsemi Solutions (U.S.), Inc., Aliso Viejo, CA (US)

(72) Inventor: Jiashu Lin, Shanghai (CN)

(73) Assignee: Microsemi Solutions (U.S.), Inc., Aliso Viejo, CA (US)

(*) Notice: Subject to any disclaimer, the term of this patent is extended or adjusted under 35 U.S.C. 154(b) by 0 days.

(21) Appl. No.: 15/893,871

(22) Filed: Feb. 12, 2018

(65) Prior Publication Data

US 2018/0165242 A1 Jun. 14, 2018

Related U.S. Application Data

(62) Division of application No. 14/846,265, filed on Sep. 4, 2015, now Pat. No. 9,921,990.

(30) Foreign Application Priority Data

Dec. 30, 2014 (CN) .......................... 2015 1 0014436

(51) Int. Cl.
G06F 13/40 (2006.01)
G06F 13/42 (2006.01)
G06F 13/362 (2006.01)

(52) U.S. Cl.
CPC ........ *G06F 13/4022* (2013.01); *G06F 13/362* (2013.01); *G06F 13/4282* (2013.01)

(58) Field of Classification Search
CPC . G06F 13/4022; G06F 13/4282; G06F 13/362
See application file for complete search history.

(56) References Cited

U.S. PATENT DOCUMENTS 7,668,925 B1 * 2/2010 Liao ........................ H04L 45/00
370/397
2005/0138261 A1 * 6/2005 Marushak ........... G06F 13/4045
710/316

(Continued)

OTHER PUBLICATIONS

U.S. Appl. No. 14/846,265, Non-Final Office Action dated Aug. 10, 2017.

(Continued)

*Primary Examiner* — Ernest Unelus
*Assistant Examiner* — Ronald T Modo
(74) *Attorney, Agent, or Firm* — Leber IP Law; David C. Robertson (57) ABSTRACT

A SAS (Serial Attached SCSI or Serial Attached Small Computer System Interface) switch includes a master SAS expander and a multitude of slave expanders connected to the master SAS expander. Each slave expander has a distinct SAS address. The slave expanders are not directly connected to one another and communicate through the master expander. The SAS switch has a pair of SAS wide ports each having a multitude of SAS links each associated with one of the slave expanders. The slave expanders are configured to route SAS traffic in accordance with routing tables established by the master SAS expander. The master SAS expander is not directly connected to either of the SAS wide ports.

6 Claims, 8 Drawing Sheets

(56) References Cited

U.S. PATENT DOCUMENTS

| | | |
|---|---|---|
| 2007/0093124 A1 | 4/2007 | Varney et al. |
| 2010/0064085 A1 | 3/2010 | Johnson et al. |
| 2012/0246521 A1 | 9/2012 | Washiya et al. |
| 2014/0189418 A1 | 7/2014 | Jinno et al. |
| 2014/0229757 A1 | 8/2014 | Danayakanakeri et al. |

OTHER PUBLICATIONS

U.S. Appl. No. 14/846,265, Notice of Allowance dated Nov. 28, 2017.

* cited by examiner

000# METHOD AND APPARATUS FOR GROUPING MULTIPLE SAS EXPANDERS TO FORM A SINGLE COHESIVE SAS EXPANDER

CROSS-REFERENCE TO RELATED APPLICATIONS

This application is a divisional of U.S. patent application Ser. No. 14/846,265 filed on Sep. 4, 2015, which claims priority to Chinese patent application No. 201510014436.0, entitled "METHOD AND APPARATUS FOR GROUPING MULTIPLE SAS EXPANDERS TO FORM A SINGLE COHESIVE SAS EXPANDER," filed Dec. 30, 2014, the contents of both of which are hereby incorporated by reference.

BACKGROUND OF THE INVENTION

The present application relates to data communication in computer storage technologies, and more particularly to improving wide port data communications.

Serial Attached Small Computer System Interface (SCSI), commonly referred to as SAS, is a point-to-point serial protocol that defines data movement to and from computer storage devices, and a protocol stack for storage entities interconnections. A SAS domain, forming a SAS topology, is typically formed by a multitude of SAS storage network elements which may include initiator SAS devices, such as a host bus adapter (HBA), a SAS expander, such as a SAS switch, and SAS end devices, such as hard disk drives in a JBOD (abbreviation for "just a bunch of disks"). As is known in the art, JBOD provides neither redundancy nor performance improvements. Hard drives may be handled independently as separate logical volumes, or they may be combined into a single logical volume using a volume manager. Each SAS device is identified with a universally unique SAS address. A SAS port can be a narrow port or a wide port. A narrow port has only one physical link (PHY), and a wide port has multiple PHYs.

A SAS expander facilitates communication between various SAS storage network elements by providing the necessary switching and routing functions. A SAS expander may also facilitate the connection between multiple SAS end devices and a single initiator port. A SAS expander often provides a number of SAS ports to enable communications between SAS devices.

Figure 1:
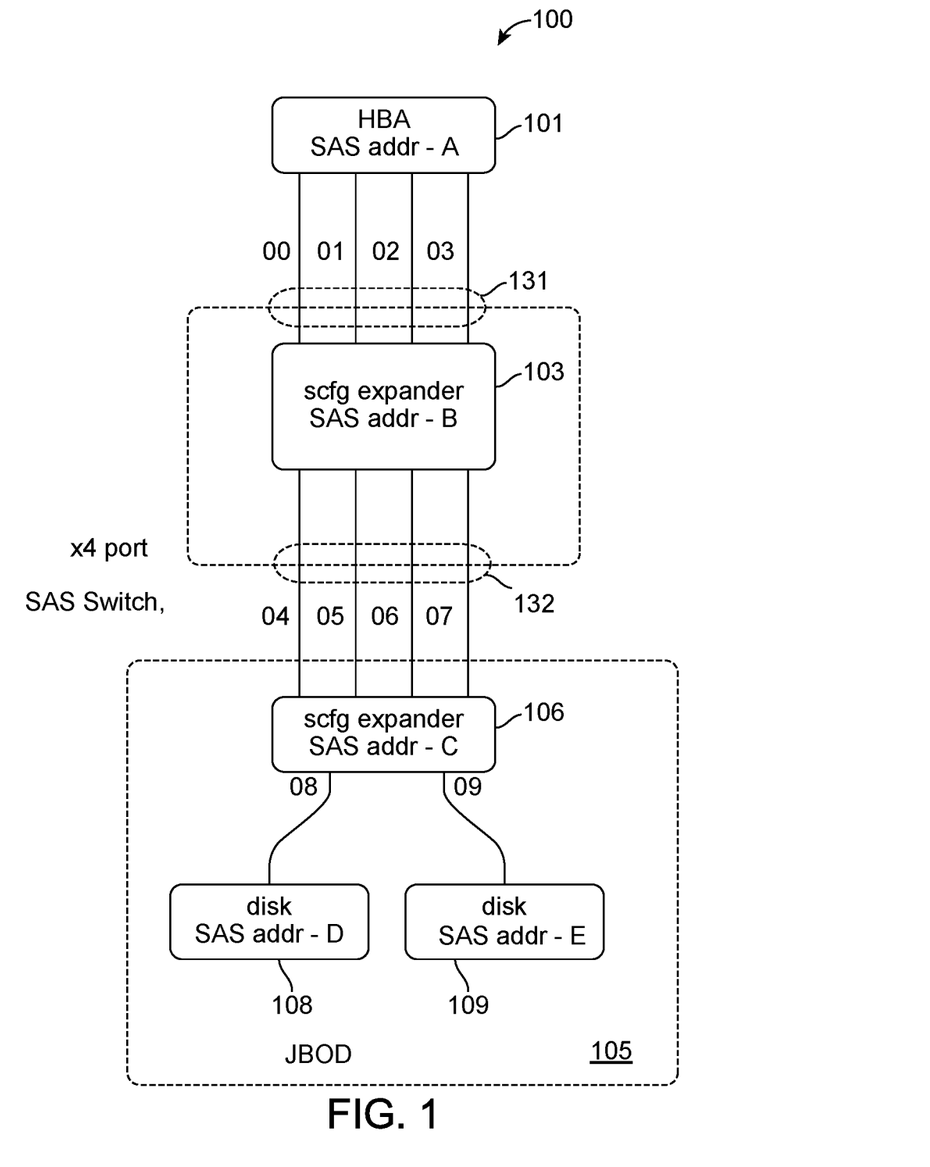
FIG. 1 is a simplified block diagram of a computer storage system in communication using a simple SAS topology.

FIG. 1 is a simplified block diagram of a computer storage system 100 using a simple SAS topology. System 100 is shown as including a single expander SAS switch 103 (which is a self-configuring expander, also shown as scfg), one HBA (host bus adapter) 101, one JBOD 105 including an expander 106 (which is also a scfg) and two disks 108 and 109, each with a different SAS address A/B/C/D/E. SAS links 00-09 are used to connect all SAS elements as illustrated. Wde port 131 connects HBA 101 to SAS switch 103 and includes SAS links 00, 01, 02, and 03. Wide port 132 connects SAS switch 103 to JBOD 105 and includes SAS links 04, 05, 06, and 07. FIG. 1 also shows two narrow port connections, i.e., disk connections SAS links 08 and 09.

On power up or link reset, SAS links 00-03 are brought up, expander 103 sends IDENTIFY address frame to HBA with the SAS address B on each of the link 00-03, HBA receives the IDENTIFY address frames on link 00-03 and finds that they contains the same SAS address of B. HBA considers itself as being directly connected to the expander 103 through the wide port defined by links 00-03. In the similar way, expander 103 considers itself as being directly connected to the HBA through the wide port that includes SAS link 00-03.

The HBA starts topology discovery towards expander B, it first sends an open request with destination SAS address of B on any one of SAS links 00-03 (for example, 00 is chosen), and expander B receives the open request and responds with an open accept. In thus way the connection between HBA and expander B is established, and SAS link 00 is dedicated for the communication between HBA and expander B. HBA sends management commands to expander B to perform discovery on the SAS devices directly attached to expander B. Expander B responds with the PHY status and reports that expander C is connected through the PHYs of SAS link 04-07. The HBA then tries to perform discovery on expander C. The HBA sends an open request with a destination SAS address C on any of the SAS link 00-03 (e.g., 00), expander B receives the open request and looks up the destination SAS address in the direct route table, and then propagates the open request to any of the SAS links 04-07(e.g., 04). Expander C receives the open request and determines that the destination SAS address is itself. Expander C then responds with an "open accept" through SAS link 04 where the open request is received. Expander B propagates the "open accept" back to the HBA on SAS link 00, and thus the SAS connection is established from HBA to Expander C using SAS links 00/04. Then HBA sends SAS management commands to expander C to discover the PHY status on expander C, and determines that two disks are connected to expander C. In this way, HBA completes the discovery process and have all the knowledge of the SAS devices in the SAS topology. HBA will use the SAS addresses discovered in the discovery process and IDENTIFY address frames when it tries to talk to the SAS device in the topology.

Expander B can also initiate the discovery process. It can send an open request with the destination SAS address C on any of the SAS links 04-07 (e.g., 04). Expander C receives the open request and responds with an "open accept," so the connection between expanders B and C is established on SAS link 04. Expander B sends management commands to expander C and discovers the PHYs on expander C. Expander C responds and reports that disk D and disk E are attached. Expander B configures disk D and disk E SAS address in its route table, and completes the discovery. SAS expander C performs a similar discovery process as expander B, and configure the HBA's SAS address A in its own route table.

The expander's discovery process will only configure SAS addresses in the route table for the SAS devices that are not directly attached. The directly attached SAS addresses will be configured in the direct route table, when receiving the IDENTIFY address frame from the peer SAS device (the identification sequence). For example, expander B configures direct route table for SAS address A and SAS address C when SAS links 01-03/04-07 are up and IDENTIFY frames are received in the identification sequence. Expander B configures route entries for SAS address D and SAS address E in the discovery process. Expander C configures the route table for directly attached devices and non-directly attached devices in a similar way.

When all the identification sequence and discovery sequence on HBA/expander B/C are completed, the route table in the expander B/C are properly configured and the HBA has the knowledge of all the expander B, C and disk D, E. HBA will use the SAS address discovered to establish the connection when trying to talk to a disk/expander.

When the HBA tries to access disk D, it sends an open request with destination SAS address of D to any of the SAS link 00-03, (say, 00 is chosen). Expander B takes the SAS address received in the open request (SAS address D) and propagates it to any of the SAS link 04-07 (say, 04 is chosen). Expander C receives the open request and looks up the route table for SAS address D and propagates the open request to SAS link 08. The disk with SAS address D receives the open request and responds with open accept to SAS link 08. The open accept is propagated back to the HBA on SAS links 08->04->00, and thus the connection between the HBA and disk D is established. The HBA communicates with disk D through SAS links 00-04-08. Before the connection is closed, no other connection is allowed to be established over SAS links 00-04-08. That is, HBA considers SAS link 00 as busy, and if it wants to talk to disk E, it will send an open requests on, e.g., SAS link 01. After HBA is finished with disk D, it sends a close primitive on SAS link 00, and the close primitive is propagated through expanders B and C on SAS link 00->04->08. Disk D will respond with a close primitive, which is propagated back to HBA using the same path. After the handshaking process described above, the connection is successfully closed.

A SAS switch is one or multiple SAS expanders that facilitates SAS data transfer between multiple host HBAs/controllers and storage devices such as JBODs. A SAS switch provides 10 disaggregation enabling a rack storage pool to be segmented and dynamically allocated among servers. In certain applications, a large number of host HBAs and JBODs may be connected to a single SAS switch.

As stated above, the port count of a single physical SAS expander device limits the number of the SAS devices that can be connected to the SAS expander. Certain SAS expander applications, such as a top-of-rack SAS switch used to connect hosts and JBODs within rack, require a high port count and cannot be built on a single physical expander device. In order to implement a high port count in an expander device, a plurality of physical expander devices is grouped together and appears externally as a single cohesive SAS expander. However, existing method of grouping a plurality of expander devices into a single, cohesive SAS expander often includes using a number of homogenous self-managed expander devices which are synchronized over direct SAS connections. The synchronization connection may use direct SAS links among the SAS expander devices. The distributed SAS implementation in multiple SAS expander devices within a SAS switch brings challenges in SAS expander management, fail-over handling, enclosure management, etc. In the existing method the expander devices are also required to be assigned with identical SAS addresses so that wide port can be formed from PHYs from each of these expanders. This requires sophisticate design because the SAS standard does not allow an identical SAS address to be shared among multiple SAS devices within the same SAS domain.

BRIEF SUMMARY OF THE INVENTION

Embodiments of the present invention provide methods and apparatus for grouping multiple SAS expander devices, including at least one master SAS expander and a multitude of slave SAS expanders, to form a single cohesive SAS expander. Each of the SAS expanders has a different SAS address. The slave SAS expanders are connected to and configured by the master SAS expander such that there is no direct SAS connection between any two of the slave SAS expanders. Physical links (PHYs) from multiple slave SAS expanders are grouped into SAS ports for external SAS device connections. The grouped SAS expanders operate and respond as a single coherent SAS expander with a unified SAS address and provide high port count SAS ports for connecting to external SAS devices. The grouping of multiple SAS expanders provides a solution for high port count SAS switch products. Embodiments of the present invention can overcome the drawbacks in existing approaches as described above, and are simpler, more scalable and more SAS standard-compliant.

According to some embodiments of the present invention, a SAS (Serial Attached SCSI or Serial Attached Small Computer System Interface) switch includes a master SAS expander and a multitude of slave expanders connected to the master SAS expander. Each slave expander has a distinct SAS address and is not directly connected to other slave expanders. A first SAS wide port has a first multitude of SAS links, each associated with a different one of the multitude of slave expanders. A second SAS wide port has a second multitude of SAS links, each associated with a different one of the multitude of slave expanders. The slave expanders are configured to route SAS traffic in accordance with routing tables established by the master SAS expander. Further, the master SAS expander is not directly connected to either the first or the second SAS wide ports.

In one embodiment, the master and slave SAS expanders are configured to operate as a single coherent SAS expander with a unified SAS address. The first and second wide ports are used for connecting the external SAS devices. In another embodiment, the master expander is configured to detect a failure with a SAS link and reroute a SAS traffic bound for that SAS link. In another embodiment, the routing table for each slave SAS expander is configured by the master SAS expander such that, during a SAS link identification sequence, the slave SAS expanders sends IDENTIFY address frames which include the master SAS expander's SAS address and a multitude of PHY identifiers globally indexed within the SAS switch. In other words, each SAS link in each of the first SAS wide port and second SAS wide port is configured to have a distinct non-overlapping external PHY identifier.

In another embodiment, each slave SAS expander communicates with the master SAS expander using the slave expander's SAS address and a local PHY identifier. In another embodiment, the master SAS expander is configured to perform SAS expander management functions, which includes terminating and servicing the SSP (Serial SCSI Protocol) and SMP (Serial Management Protocol) commands from external SAS devices as a SAS management target, and sending SSP and SMP commands to slave SAS expanders and external SAS devices as a SAS management initiator. In another embodiment, SAS switch also includes a third and a fourth wide ports, each PHY in the wide port is associated with a different one of the slave expanders. The third SAS wide port is configured for connecting to a third external SAS device, and the fourth SAS wide port is configured for connecting to a fourth external SAS device. In another embodiment, each slave SAS expander is configured to route SAS traffic among external SAS devices and route SAS management traffic to and from the master SAS expander.

According to some embodiments of the invention, a method for forming a single coherent SAS (Serial Attached SCSI or Serial Attached Small Computer System Interface) expander includes assigning a SAS expander as a master SAS expander, and assigning a multitude of SAS expanders as slave SAS expanders, each of the multitude of SAS expanders has a distinct SAS address. The method also includes connecting each of the slave SAS expanders to the master SAS expander through at least one internal SAS link and inhibiting direct connection between any two of the slave SAS expanders. The method includes forming a first SAS wide port having a first plurality of SAS links each associated with a different one of the plurality of slave expanders, and forming a second SAS wide port having a second plurality of SAS links each associated with a different one of the plurality of slave expanders. The method also includes configuring the multitude of slave expanders to route SAS traffic in accordance with routing tables established by the master SAS expander.

In an embodiment, the slave SAS expanders are configured by the master SAS expander for SAS routing, and the slave SAS expanders are non-self-configuring. In an embodiment, the method includes configuring the slave SAS expanders such that the IDENTIFY address frames sent to external SAS devices by the slave expanders include a SAS ADDRESS field set to the master SAS expander's SAS address and a PHY IDENTIFIER field set to a PHY identifier that is uniquely indexed within the single coherent SAS expander. In an embodiment, the method further includes forming no direct connection between the master expander and the wide port. In an embodiment, the method further includes configuring the slave SAS expanders such that SAS traffic between two external SAS devices is routed via external SAS wide ports. In an embodiment, the master SAS expander is configured to detect a failure with a first one of a multitude of SAS links and reroute a SAS traffic bound for the first one of the multitude of SAS links.

According to some embodiments of the present invention, a method is provided for managing an IDENTIFY address frame in a first SAS (Serial Attached Small Computer System Interface) device, which is characterized by a first set of values for the fields in the IDENTIFY address frame. The method includes receiving a second set of values for the fields in the IDENTIFY address frame, which are different from the first set of values. The method also includes, in a SAS link identification sequence, presenting an IDENTIFY address frame having the second set of values to another SAS device. In an embodiment, the method includes receiving the second set of values for the fields in the IDENTIFY address from a first SAS link of the first SAS device, and presenting the second set of values for the fields in the IDENTIFY address to a second SAS link of the first SAS device. In another embodiment, the method includes, in a SAS switch having a master expander and a multitude of slave expander, configuring the routing table for the slave SAS expanders such that, in a SAS link identification process, the slave SAS devices are configured to send IDENTIFY address frames which include the master SAS expander's SAS address and a distinct external PHY identifier.

According to some embodiments, in a single cohesive SAS (Serial Attached Small Computer System Interface) expander including a master SAS expander and a multitude of slave SAS expanders, a method is provided for the master expander to create a fail-over SAS path. The method includes receiving a PHY status change event from a slave SAS expander with a failed SAS link, and performing a discovery process on the slave SAS expander and to identify the failed SAS link. The method also includes performing discovery processes on other slave SAS expanders to find a replacement slave SAS expander that is capable of routing the SAS traffic affected by the failed SAS link. The method includes configuring route entries on the slave SAS expander with the failed SAS link to route affected SAS traffic to the master SAS expander, and configuring route entries on the replacement slave expander to route the affected SAS traffic from the master expander to a SAS link of the replacement expander to replace the failed SAS link.

In an embodiment, the slave SAS expander with the failed SAS link reports the PHY status change event to the master SAS expander via a BROADCAST (Change) primitive. In another embodiment, the failed SAS link is an external SAS link connected to an external SAS device.

DETAILED DESCRIPTION OF THE INVENTION

Embodiments of the present invention provide methods and apparatus for grouping multiple SAS expanders to form a high port count single cohesive SAS expander or a SAS switch configured to provide, among other operations, non-block SAS switching functionality.

A high port count SAS switch, in accordance with embodiments of the present invention, provides a number of advantages, as described further below. With regard to HBA/JBOD connectivity, the wide port SAS switch can provide flexible connectivity, such that the HBA/JBOD (i) ratio is flexible and (ii) may be connected to any port on the SAS switch. In some embodiments, connections to the HBA/JBOD are wide port connections (e.g., ×4 or ×8, etc.), and no direct connections are made to HDD. The SAS switch can provide non-block SAS switching fabric so that no traffic bottleneck is present within the SAS switch, i.e., no internal cascading occurs for normal data path (all paths in parallel). Currently the maximum PHY count is 255 (including vphy), which is limited by the 8 bit PHY IDENTIFIER field. The high port count SAS switch, in accordance with embodiments of the present invention, provides a multi-expander solution that overcomes the current maximum PHY count in a single expander of 255 (including vphy), which is limited by the 8 bit PHY IDENTIFIER field.

Further, the SAS switch is a single cohesive expander such that the SAS switch is externally viewed as a single logical expander. The multi-expander logical expander can provide external operation and performance similar to that of a single physical expander. On the other hand, the internal multi-expander topology and management mechanism is transparent to external SAS devices.

In some embodiments of the present invention, a SAS switch includes a master SAS expander device and a multitude of slave SAS expander devices each assigned a different SAS addresses. The slave expander devices are managed by the master expander device and are configured to route the SAS traffic among external SAS devices and forward the SAS management traffic to and from the master expander device. Embodiments of the present invention thus are simpler and more scalable, and can overcome the drawbacks associated with conventional solutions, such as complex synchronization and fail-over handling. Further, the SAS switch according to embodiments of the invention includes multiple expanders, each of which has a distinct SAS address, and is more SAS standard-compliant than conventional solutions. However, in accordance with embodiments of the invention, the SAS switch appears to external devices with a single unified SAS address and a high port count.

In accordance with one embodiment of the present invention, for a multitude of physical SAS expanders are grouped to form a single cohesive SAS expander. A SAS switch, in accordance with embodiments of the present invention, may include at least two slave SAS expander devices (hereinafter alternatively referred to as slave or SAS slave) and a master SAS expander device (hereinafter alternatively referred to as master or SAS master). Each slave is connected to a master via at least one SAS link. The master and slaves have different SAS addresses. A common SAS wide port for the SAS switch may be formed by grouping at least one PHY of one of the slaves with at least one PHY of another slave. Even though each slave SAS expander has a distinct SAS address, the SAS switch appears to the external devices with a single unified SAS address and a high port count. In some embodiments, this is achieved by the master expander configuring each slave to send IDENTIFY address frames with the SAS address assigned to the master expander device and a globally numbered PHY index on the PHY of the slave expander device in the common SAS wide port.

The master is responsible for SAS expander management operations such as terminating and servicing the SSP (Serial SCSI Protocol) and SMP (Serial Management Protocol (SMP) commands from external SAS devices as a SAS management target, sending SSP and SMP commands to slaves and external SAS devices as a SAS management initiator, and the like. The slaves are responsible for routing SAS traffic among external SAS devices and routing SAS management traffic to and from the master. Because SAS expander management operations are performed by the master, the need for synchronization between slaves is eliminated. The external SAS wide port combined with PHYs from different slave SAS expanders provides non-blocking SAS switching functionality for SAS traffic among external SAS devices. In some embodiments, the PHYs in any of the SAS port can be used in establishing a connection path between any two of the external SAS devices in the SAS domain in which a set of SAS devices communicate with one another, or between one of the external SAS devices and the master.

Figure 2:
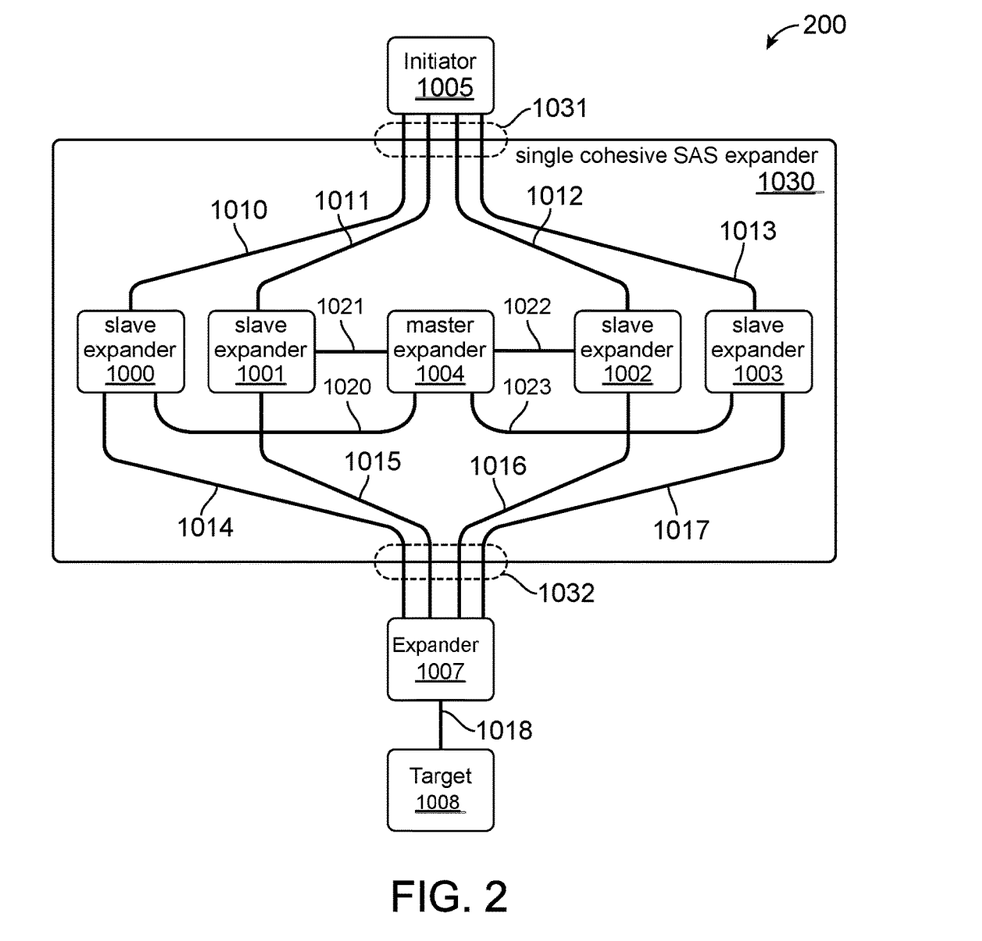
FIG. 2 is a simplified block diagram of a host system coupled to a target device using a SAS switch according to an embodiment of the present invention.

FIG. 2 is a simplified block diagram of a computer system 200 shown as including in part, an initiator (host) 1005 coupled to a target device 1008 via expander 1007 and a multitude of SAS (Serial Attached Small Computer System Interface) expanders 1000, 1001, 1002, 1003, and 1004 collectively forming a single cohesive SAS expander 1030, in accordance with one embodiment of the present invention. As shown in FIG. 2, single coherent SAS expander (also referred to herein as SAS switch) 1030 includes a master SAS expander 1004 and a multitude of slave expanders 1000, 1001, 1002, and 1003. The slave expanders are not directly coupled to one another and each has an SAS address different from the SAS addresses of the master and other slave expanders. The SAS switch 1030 is shown as having a first SAS wide port 1031 for communicating with initiator 1005, and a second SAS wide port 1032 for communicating with target 1008 via expander 1007. For example, initiator 1005 can be a computer, and target 1008 can be a hard disk. First SAS wide port 1031 has a multitude of SAS links, namely SAS links 1010, 1011, 1012, and 1013, respectively coupling slave expanders 1000, 1001, 1002, 1003 to initiator 1005. Second SAS wide port 1032 has a multitude of SAS links, namely SAS links 1014, 1015, 1016, and 1017, respectively coupling slave expanders 1000, 1001, 1002, and 1003 to target 1008 via expander 1007. The master SAS expander is not directly connected to either the first or the second SAS wide ports.

As shown in FIG. 2, slave expanders, 1000, 1001, 1002, and 1003 communicate with master expander 1004 through SAS connections 1020, 1021, 1022, and 1023, respectively. The SAS connections, 1020, 1021, 1022, and 1023, each includes at least one SAS link. Master expander 1004 is not directly connected with external devices to which SAS switch 1030 is connected.

Master SAS expander 1004 is responsible for managing the overall activities of SAS switch 1030, including, in part, (i) performing the topology discovery process, (ii) configuring the routing entries for the slave SAS expanders, (iii) responding to SAS management and enclosure management commands from external SAS devices (e.g., initiator 1005), and (iv) handling error conditions such as link fail-over. Upon detecting a failure on an SAS link, master expander 1004 provides an alternative SAS route, thereby managing link fail-over.

Slave SAS expanders 1000, 1001, 1002, and 1003 are configured to route SAS traffic among the external SAS devices in accordance with the routing tables established by the master expander and stored in the slave expanders during the topology discovery process. From the viewpoint of the external devices, SAS switch 1030 appears as a single SAS expander. Internal to SAS switch 1030, however, the slave expanders are individually SAS addressable by the master expander. The slave expanders do not perform topology discovery process and do not configure route entries in their own routing table. The route tables and entries in the slave SAS expanders are configured by the master SAS expander, as described above.

According to SAS specification, in the SAS identification sequences peer SAS devices directly connected by a SAS link identify each other by exchanging IDENTIFY address frames that includes, in part, SAS device capability, SAS address, PHY identifier, and the like.

SAS switch 1030 is identified with a unique SAS address and globally indexed PHY identifiers globally indexed within the SAS switch. For example, referring to FIG. 2, SAS master's SAS address SAS_ADDR_1004 and the globally indexed PHY identifies are defined in the IDENTIFY address frames on external links 1010-1017. For example, SAS slave 1000 may have PHY identifiers ranging from 0 to 29; SAS slave 1001 may have PHY identifiers ranging from 30 to 59; SAS slave SAS 1002 may have PHY identifiers ranging from 60 to 89; and SAS slave 1003 may have PHY identifiers ranging from 90 to 119. With this configuration, SAS switch 1030 appears to external SAS devices, such as devices 1005, 1007, and 1008, as a single cohesive expander device having as its SAS address the SAS master address SAS_ADDR_1004, and a multitude of globally indexed PHYs ranging from 0 to 119, for this example. External SAS devices can send SAS management traffic to the slave SAS expanders. SAS management traffic may include, for example, SMP and SSP commands for SAS topology discovery, SAS management, and enclosure management services. The SAS management traffic is routed by slave SAS expanders 1000-1003 to master SAS expander 1004 and centrally handled by master SAS expander 1004. Master SAS expander 1004 together with the slave SAS expanders respond to the external SAS devices in unison so as to appear as a single cohesive SAS expander to all external devices.

Internal to SAS switch 1030, SAS master 1004 and SAS slaves are identified with different SAS addresses and a locally indexed PHY identifiers to accommodate internal traffic management exchanged over the internal SAS links. The SAS slave 1000-1003 send IDENTIFY address frames on the internally connected SAS links using their local SAS addresses and locally indexed PHY identifiers.

In other words, for communication with external SAS devices on the external connected SAS links 1010-1017, SAS slaves 1000-1003 send IDENTIFY address frames that have the SAS master SAS address, SAS_ADDR_1004, and their globally indexed PHY identifiers. For internal communication, each SAS slave (e.g., slave 1000) sends IDENTIFY address frames on an SAS link (e.g., SAS link 1020) to communicate with SAS master 1004; such address frames have the slave's own local SAS address (e.g., SAS_ADDR_1000), and a locally indexed PHY identifier. SAS master 1004 sends IDENTIFY address frames on any of the links 1020-1023; each such frame has SAS master's own local SAS address, namely SAS_ADDR_1004 and SAS master's PHY identifiers.

As described above, the SAS master 1004 has an SAS address that is different from the SAS addresses of any of the SAS slaves. The SAS master is further configured to implement a virtualization layer to provide cohesive SAS expander SMP and SSP interfaces to external SAS devices. As described above, SAS master 1004 is further configured to manage the internal slave SAS expanders. There's no direct SAS links between the SAS master 1004 and any of the external SAS devices. SAS link fail over is also managed by the SAS master by configuring the specific slave SAS expander route entries for an alternative SAS route to the failed SAS link.

SAS slaves 1000, 1001, 1002, and 1003 are responsible for, among other things, (i) routing management traffic between the SAS master SAS and any of the SAS devices external to SAS switch 1030, and (ii) routing SAS traffic among the external SAS devices, and reporting local PHY events to the SAS master. The SAS slaves have different SAS addresses and remain individually SAS addressable by the SAS master, yet the SAS slaves' IDENTIFY frames are provided such that SAS switch 1030 is viewed externally as a single cohesive expander 1030. In the embodiment shown in FIG. 2, there is no direct SAS links between any of the SAS slaves. Furthermore, in the embodiment shown in FIG. 2, SAS slaves do not perform topology discovery process and do not configure route entries in their own route tables. The route entries in the slave SAS expanders are configured by the master SAS expander.

According to the SAS specification, IDENTIFY address frames are used for the SAS identification sequences. Peer SAS devices directly connected by a SAS link identify each other by exchanging IDENTIFY address frames containing their SAS information, including SAS device capability, SAS address, and PHY identifier, and the like.

When SAS switch 1030 is powered up, SAS master 1004, and SAS slaves 1000-1003 are powered up concurrently and internal SAS links in connections, 1020-1023, become active. SAS master 1004 and SAS slaves 1000-1003 exchange IDENTIFY address frames which contain their local SAS addresses and local PHY identifiers over the links disposed in the internal SAS connections. SAS master discovers the SAS slaves directly connected to the SAS master. As described above, SAS slaves do not perform topology discovery process. Each SAS slave receives an IDENTIFY address frame from the SAS master on the SAS link directly connecting the SAS slave and master. The SAS master configures the routing table in each of the SAS slaves thus enabling SAS traffic to be routed by the slaves to the master. The routing table is configured by the master during the discovery processes. The SAS master is further configured to route entries for any virtual SSP target on the slaves.

In the embodiment shown in FIG. 2, each wide SAS port is shown as having four SAS links, each of which comes from a different SAS slave. Accordingly, SAS links 1010-1013 are grouped together into wide SAS port 1031, and SAS links 1014-1017 are grouped together into wide SAS port 1032. As described above, SAS slaves 1000-1003 manage the IDENTIFY address frames sent to the external SAS links by setting the SAS address field of the frame with the SAS address of master SAS expander 1004, SAS_ADDR_1004, and setting the PHY IDENTIFIER field with a globally indexed PHY ID. External SAS devices, e.g., SAS initiator device 1005 and SAS expander device 1007, regard themselves as directly connected through the SAS wide port connections, i.e. wide port 1031 (formed using SAS links 1010-1013) or wide port 1032 (formed using SAS links 1014-1017) to a single cohesive SAS expander device 1030, whose SAS address is the SAS master's SAS address, SAS_ADDR_1004.

According to some embodiments of the present invention, a method is provided for managing an IDENTIFY address frame in a first SAS (Serial Attached Small Computer System Interface) device, which is characterized by a first set of values for the fields in the IDENTIFY address frame. The method includes receiving a second set of values for the fields in the IDENTIFY address frame, which are different from the first set of values. The method also includes, in a SAS link identification sequence, presenting an IDENTIFY address frame having the second set of values to another SAS device. In an embodiment, the method includes receiving the second set of values for the fields in the IDENTIFY address from a first SAS link of the first SAS device, and presenting the second set of values for the fields in the IDENTIFY address to a second SAS link of the first SAS device. In another embodiment, the method includes, in a SAS switch having a master expander and a multitude of slave expander, configuring the routing table for the slave SAS expanders such that, in a SAS link identification process, the slave SAS devices are configured to send IDENTIFY address frames which include the master SAS expander's SAS address and a distinct external PHY identifier. In another embodiment, a non-transitory computer-readable medium is provided storing statements and instructions for execution by a processor to perform a method of managing an IDENTIFY address frame in a first SAS device as outlined above. In another embodiment, a first SAS device is provided including a processor and a memory storing statements and instructions for execution by a processor to perform a method of managing an IDENTIFY address frame in a first SAS device as outlined above.

When the status of a SAS link on SAS switch 1030 changes, e.g., from ready to not ready or vice versa, SAS master 1004 performs a SAS topology discovery process of the changed port status and configures route entries on the slave SAS expander to which the changed port is connected. The external SAS devices also performs SAS topology discovery to discover SAS switch 1030.

As an example of direct SAS connection handling, when the status of SAS link 1014 on SAS slave 1000 connected to external SAS expander 1007 becomes ready, SAS slave 1000 detects the PHY status change and reports the PHY change event to SAS master 1004 by sending a BROADCAST (Change) primitive through SAS link 1020. Master expander 1004 receives the BROADCAST (Change) primitive and performs topology discovery process on SAS connection 1020 where the BROADCAST (Change) was received. During the topology discovery process, the master expander sends SMP commands, such as SMP REPORT GENERAL, SMP DISCOVERY command, to slave expander 1000, and finds that one of PHYs on slave expander 1000 becomes ready and an external SAS expander device 1007 is connected through the SAS link 1014. SAS master 1004 configures a local route entry for expander 1007, then sends SMP commands, such as SMP REPORT GENERAL, SMP DISCOVERY command, to expander 1007 and finds that the expander 1007 is connected to a SAS target device 1008 through SAS link 1018. SAS master 1004 sends an SMP CONFIGURE ROUTE INFORMATION command to SAS slave 1000 to configure a route entry for SAS target device 1008 in SAS slave 1000's route table. As there is no more expander device to discover, the topology discovery process originated by SAS master 1004 is completed. There is one SAS link on each of the four SAS slaves connected to the expander 1007. The four SAS links 1014, 1015, 1016, and 1017 are expected to become ready concurrently. SAS master 1004 then performs the SAS topology discovery process for the other three SAS links, 1015, 1016, and 1017, when they become ready one by one. As the external topology connected to the SAS links 1014-1017 is the same, the master expander can choose to perform full SAS topology discovery process just as the one for SAS link 1014, or it can just copy the route entries for SAS link 1014 in SAS slave 1000 to the other three SAS slave 1001, 1002, and 1003. The master expander sets the self-configuring bit to 1 while performing the discovery processes for the PHY status change events from the four SAS slaves to indicate that the single cohesive expander 1030 is in configuring status, and set the self-configuring bit to 0 when all of the four topology discovery processes are completed to indicate the single cohesive expander 1030 is not in configuring status. The SAS master can send proprietary commands through SAS link or out-of-band link to the SAS slave to send the BROADCAST (Change) primitives to all the SAS slave external SAS ports except for the SAS port where the SAS link just becomes ready. The master expander can also implement a timeout value to wait for all of the four PHY status events being reported and discovery processes being completed. When it times out and not all of the four PHY status events have been reported and the discoveries to the four slave expanders are not completed in time, a decision is made that not all of the four SAS links in the wide port connected the expander 1007 become ready. At this time, a link fail-over handling is performed, as described further below.

An example of direct SAS connection tear down handling is described below. When the status of a SAS link, e.g., SAS link 1014, on slave expander 1000, connected to the external SAS expander 1007, becomes not ready, SAS slave 1000 detects the PHY status change and reports the PHY change event to SAS master 1004 with a BROADCAST (Change) primitive through one of the SAS links in the SAS connection 1020. SAS master receives the BROADCAST (Change) primitive and performs a topology discovery process on the SAS connection 1020 where the BROADCAST (Change) was received. During the topology discovery process, SAS master sends SMP commands, such as the SMP REPORT GENERAL, SMP DISCOVERY command, to slave expander 1000 and finds that one of PHYs on the slave expander 1000 has become not ready, and the external SAS expander device 1007 is no longer connected through the SAS link 1014. SAS master 1004 sends SMP CONFIGURE ROUTE INFORMATION command to SAS slave 1000 to remove all the route entries on slave expander 1000 related to the SAS link 1014. Thus, the topology discovery process on SAS master 1004 is completed.

Since there is one SAS link on each of the four SAS slaves that is connected to external expander 1007, and status of SAS links 1014-1017 are changed concurrently, SAS master performs the SAS topology discovery processes for the other three SAS links, 1015, 1016, and 1017. SAS master 1004 removes the related route entries for SAS links 1015, 1016, and 1017 in SAS slaves 1001, 1002, and 1003. SAS master 1004 sets the self-configuring bit, for example, to 1 while performing the discovery processes for the PHY status change events from the four SAS slaves to indicate that the single cohesive expander 1030 is in configuring status and sets the self-configuring bit to, for example, 0, when all of the four topology discovery processes are completed to indicate the single cohesive expander 1030 is not in configuring status. SAS master 1004 sends proprietary commands through SAS link or out-of-band link to the SAS slaves to send the BROADCAST (Change) primitives to all the SAS slave external SAS ports. SAS master 1004 implements a timeout value to wait for all of the four PHY status events to be reported and discovery processes to be completed. When it times out and not all of the four PHY status events have been reported and the discoveries of the four slave expanders are not completed in time, an indication is made that not all of the four SAS links in the wide port connected to expander 1007 have become not ready concurrently. A link fail-over handling should be performed for this case.

When the status of a SAS link which is not directly attached to SAS switch 1030 changes, e.g., changing from ready to not ready, or changing from not ready to ready, SAS switch 1030 is notified of the topology change by a BROADCAST primitive, and performs SAS topology discovery on the port from which the BROADCAST primitive was received. SAS switch 1030 propagates a BROADCAST primitive to the external SAS ports which did not send a BROADCAST primitive to report their status.

As an example of a remote SAS connection handling, when a remote SAS link on an external SAS expander, e.g., SAS link 1018 on expander 1007 connected to SAS target device 1008, becomes ready, SAS expander 1007 reports the PHY change event to the connected SAS slave 1000 with a BROADCAST (Change) primitive. SAS slave 1000 propagates the BROADCAST (Change) primitive to SAS master 1004 through one of the SAS link in the SAS connection 1020. SAS master 1004 receives the BROADCAST (Change) primitive and performs topology discovery towards the SAS connection 1020 where the BROADCAST (change) was received. During the topology discovery process, SAS master 1004 sends SMP commands, such as SMP REPORT GENERAL, SMP DISCOVERY command, to slave expander 1000 and finds that the BROADCAST (Change) is from SAS link 1014 connected to external expander 1007. SAS master 1004 continues to discover the expander 1007 and finds that SAS link 1018 has become ready. SAS master 1004 sends SMP CONFIGURE ROUTE INFORMATION commands to slave expanders 1000, 1001, 1002, and 1003 to configure route entries for SAS target 1008. SAS master 1004 sets the self-configuring bit to, e.g., 1 while performing the discovery processes for received BROADCAST (Change) primitive to indicate that expander 1030 is in configuring status. SAS master 1004 sets the self-configuring bit to, for example, 0 when the topology discovery process is completed, thereby to indicate that SAS switch 1030 is not in a configuring status. Thus, SAS switch 1030 performs SAS topology discovery on the port from which the BROADCAST primitive was received. SAS switch 1030 propagates a BROADCAST primitive to the SAS ports which did not send a BROADCAST primitive to report their status.

Below is an example of a remote SAS connection tear down. When a remote SAS link on an external SAS expander, e.g., SAS link 1018 on expander 1007 connected to a SAS target device 1008, becomes not ready, SAS expander 1007 reports the PHY change event to the connected SAS slave 1000 with a BROADCAST (Change) primitive. SAS slave 1000 then propagates the BROADCAST (Change) primitive to SAS master 1004 through one of the SAS links in SAS connection 1020. SAS master 1004 receives the BROADCAST (Change) primitive and performs topology discovery on SAS connection 1020 from which the BROADCAST (change) primitive was received. During the topology discovery process, SAS master 1004 sends SMP commands, such as SMP REPORT GENERAL, SMP DISCOVERY command, to SAS slave 1000 and finds that the BROADCAST (Change) primitive is from SAS link 1014 connected to external expander 1007. SAS master 1004 continues to discover the expander 1007 and finds that the SAS link 1018 is not ready. SAS master 1004 sends SMP CONFIGURE ROUTE INFORMATION commands to SAS slaves 1000, 1001, 1002, and 1003 to remove all their route entries related to SAS link 1018, i.e., removes the route entries for SAS target 1008. SAS master 1004 sets the self-configuring bit to, e.g. 1, while performing the discovery processes for received BROADCAST (Change) primitive to indicate that SAS switch 1030 is in a configuration mode. SAS master 1004 sets the self-configuring bit to, e.g. 0, when all of the topology discovery process is completed to indicate that SAS 1030 is not in a configuration mode. SAS master sends proprietary commands through SAS links or out-of-band links to SAS slaves to propagate the BROADCAST (Change) primitives to all external SAS ports on the SAS slaves except for the one where BROADCAST (Change) primitive is received.

When an external SAS devices performs a discovery process, SAS switch 1030 responds to SAS commands issued by the external SAS device as an SSP or SMP target of the discovery. During the SAS topology discovery process, external SAS devices send SMP commands to SAS switch 1030, and further send SSP commands to the virtual SSP target implemented in the SAS expander. The SMP and SSP traffic to the SAS switch 1030 is routed to the SAS master by the SAS slaves. A software virtualization layer is implemented in the SAS master for external SMP and SSP handling. When the SAS master performs such virtualization layer, the SAS master saves the SAS slave information, such as PHY status information, in SAS slaves and external SAS devices. The virtualization layer uses the information saved to respond to external SMP commands. For example, when an external SAS device sends an SMP DISCOVERY command to discover a PHY on SAS switch 1030, the virtualization layer maps the globally indexed SAS PHY in the SMP DISCOVERY command to a local PHY on a SAS slave and responds with the information saved for that PHY. When an external SAS device sends an SES (SCSI Enclosure Services) command to a virtual target implemented in SAS switch 1030, the command is routed to the SAS master by the SAS slaves. The SES commands are handled in the SAS master for enclosure management.

In a specific embodiment, a SAS switch described above can include four model SXP68×12G expander devices, as SAS slaves, and one model SXP36×12G expander device as a SAS master SAS, both of which device models are commercially available from PMC-Sierra (https://pmcs.com/) The SAS switch can have 60 SAS ports for external SAS device connection,. Each SAS port has four SAS links each connected to a different SAS slave. The SAS master SXP36×12G is connected to each of the SAS slaves SXP68× 12G using an eight-link wide port. The SAS slaves are configured as non-self-configuring (nscfg) expanders, and the SAS master is configured as a self-configuring (scfg) expander. The SAS master hardware and firmware manage the IDENTIFY address frames associated with SAS slaves. A virtualization layer is implemented in the management SAS expander firmware for the single cohesive SAS expander management to provide a single SAS address for the SAS switch and wide ports having non-overlapping PHYs, as described above with reference to FIG. 2.

When the status of the links within an external SAS wide port of SAS switch 1030 are detected as being inconsistent, the SAS traffic between the external SAS initiator and SAS target connected by SAS switch 1030 may be blocked if route entries are not configured for the failed SAS link. For example, assume SAS link 1014 status is not ready while SAS link 1015, 1016 and 1017 statuses are ready. When SAS initiator 1005 tries to establish a SAS connection with target 1008, it chooses to send the open connection requests over one of the SAS links of 1010, 1011, 1012, 1013 without being aware that the SAS link 1014 is not ready. If the open connection requests are sent over SAS links 1011, 1012, or 1013, it can be propagated to external expander 1007 by SAS slaves 1001, 1002, or 1003 through SAS links 1015, 1016, or 1017, respectively. However, if SAS initiator 1005 chooses to send the open connection requests over SAS link 1010, because SAS link 1014 is not ready, the request to propagate the requests over SAS link 1014 will not be achieved. The open requests are rejected if there's no alternative route to the SAS target 1008. The link fail-over handling is required to solve this problem.

Inconsistencies within a SAS wide port link status are identified by the SAS master. As described above, if the status of all SAS links within a wide port are not detected as being consistent within a predefined time (time-out), the SAS performs a link fail-over handling. The purpose of link fail-over handling is to route the traffic destined for the SAS slave attached to the failed SAS link to another SAS slave.

Such rerouting and the required changes in the slaves' routing tables are performed by the SAS master.

For example, assume that SAS link 1014 status indicates that it is not ready while SAS links 1015, 1016, and 1017 are ready. Accordingly, SAS master 1004 configures the route entries on SAS slave 1000 to route all the SAS traffic destined for external SAS expander 1007 and external SAS target device 1008. Such traffic is routed through one of SAS links 1021, 1022, or 1023. The route entries on the other SAS slaves are not changed.

If multiple external SAS targets are affected by a failed link, SAS master 1004 may distribute the route entries to different SAS slaves to achieve load balancing. The link fail-over route entries in SAS slave 1000 and SAS master 1004 are configured accordingly. Any open connection request by initiator SAS device 1005 is routed to SAS master 1004 and then routed to, for example, SAS slave 1001, which is assumed to have a ready SAS link connected to expander 1007 and a valid route entry for target SAS device 1008. The open connection requests are routed to expander 1007 and then arrive at the target 1008 successfully.

Figure 3:
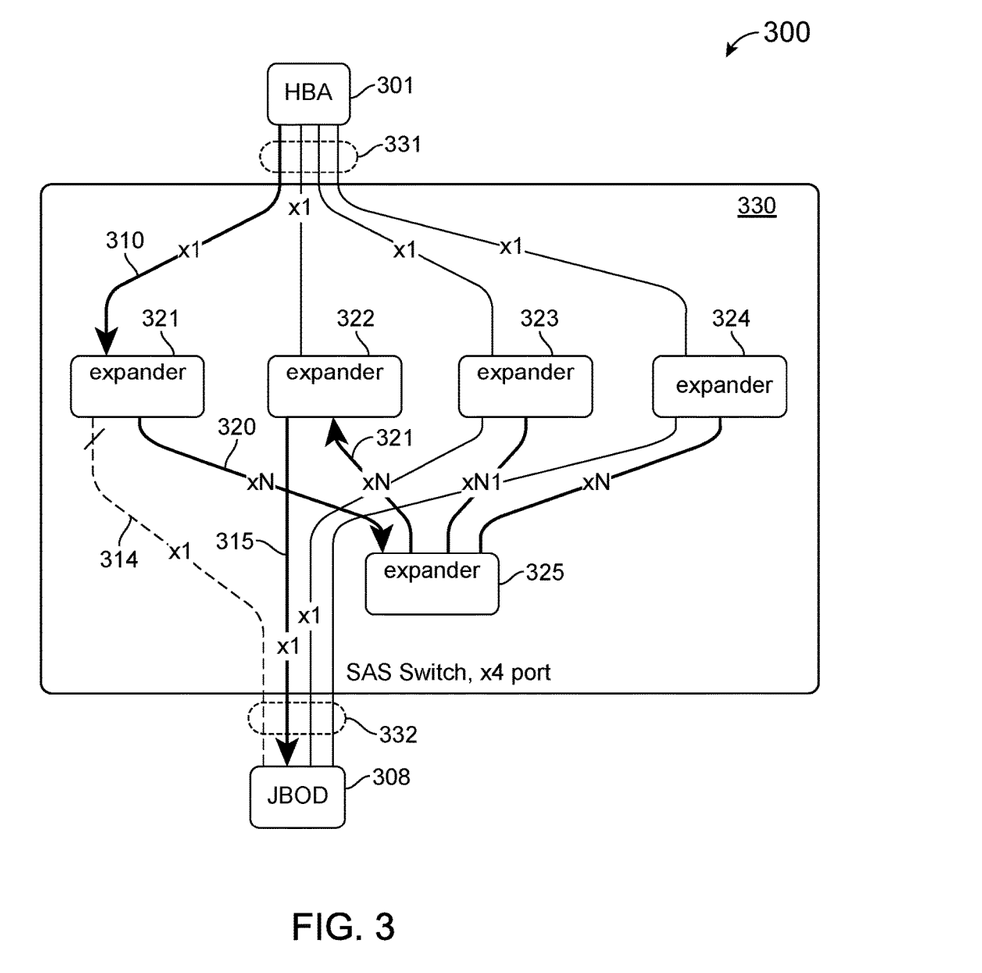
FIG. 3 is a simplified block diagram illustrating a method for creating a fail-over SAS path in a single cohesive SAS expander according to an embodiment of the present invention.

FIG. 3 is a simplified block diagram of an SAS expander 330, in accordance with another embodiment of the present invention SAS expander (also referred to herein as SAS switch) 330, is shown as including a SAS master 325 and a multitude of SAS slaves 321, 322, 323, and 324. SAS slaves 321-324 are non-self-configurable (nscfg), and thus do not configure themselves. SAS master 325 is self-configuring (scfg) and performs configuration functions for itself and SAS slaves 321-324. SAS switch 330 has two wide ports, 331 and 332. The first wide port 331 is shown as including four links coupled to initiation device HBA 301; the second wide port 332 is also shown as including four links coupled to target SAS device JBOD 308. In FIG. 3, reference numeral ×1 indicates one SAS link, and reference numeral ×N indicates N SAS links, where N is an integer.

During normal operation, traffic between initiator device HBA 301 and target device JBOD 308 is assumed to be established via SAS link 310 of wide port 331, slave expander 321, and SAS link 314 of wide port 332. Assume, for example, that SAS slave 321 has a failed SAS link 314 detected during a PHY status change event by SAS master 325, for example, via a BROADCAST (Change) primitive. SAS master 325 then performs a discovery to the SAS slave with the failure SAS link and detecting the failure external SAS link 314. In response, SAS master 325 performs further discoveries with other SAS slaves to find a replacement SAS slave (e.g., expander 322, expander nscfg B) that can route the traffic affected by the fail of link 314. Assume that SAS master 325 substitutes SAS slave 322 for slave 321 to reroute the affected traffic. Having identified SAS expander 322 as a replacement SAS master 325 configures the local route entries in the SAS slaves so as to route the affected SAS traffic to SAS slave 322. In an embodiment, SAS master 325 configures route entries in SAS slave 321 so that traffic destined for the failed link 314 is routed to SAS master 325. Route entries in master expander 325 are also configured to route the traffic received from slave 321 to slave 322. Moreover, route entries in slave expander 322 are configured to route the traffic to target device 308. With this arrangement, failed SAS link 314 (shown in broken lines in FIG. 3) is replaced by the path shown as including SAS link 320 leading to SAS master 325 leading to SAS link 322 t and SAS link 315. In some embodiments, load balancing is achieved by configuring the route entries in SAS master 325 to group the JBOD devices and route each group to different SAS slaves that have an operational link to the JBOD.

Figure 4:
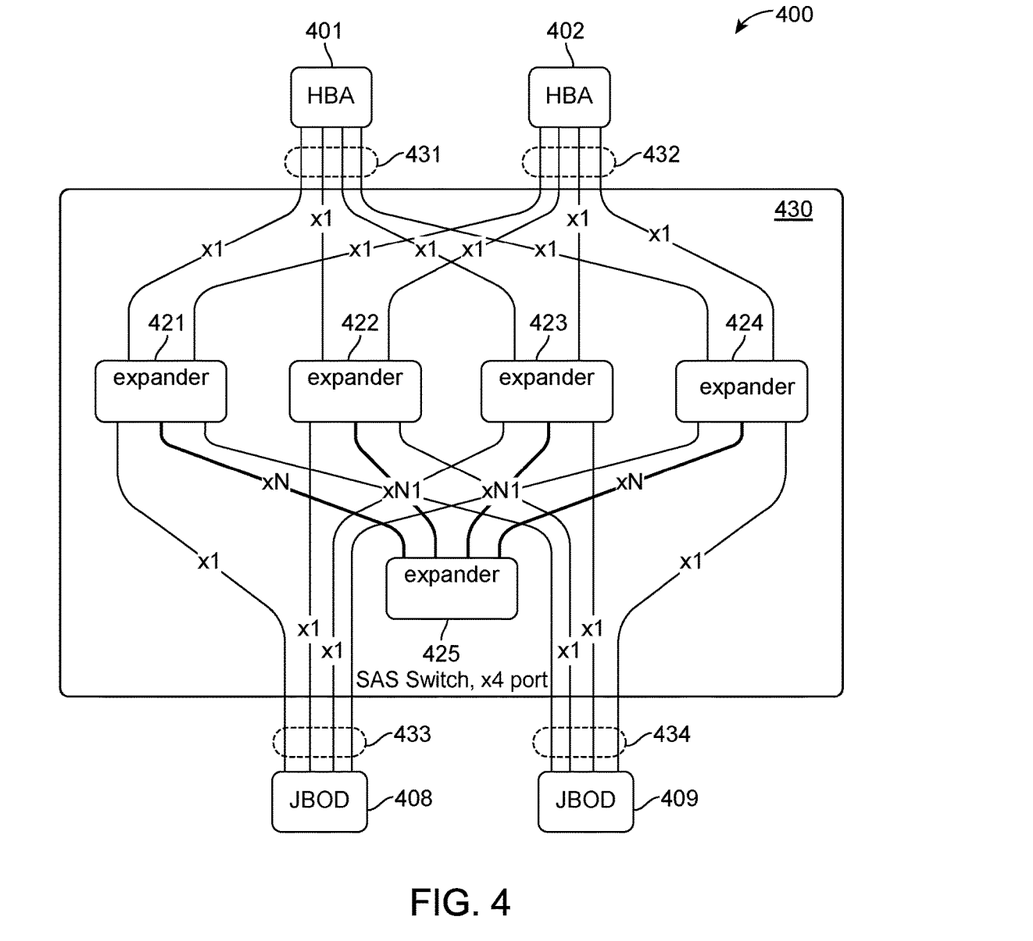
FIG. 4 is a simplified block diagram illustrating a system including a single cohesive SAS expander according to another embodiment of the present invention.

FIG. 4 is a simplified block of a system 400 including a SAS expander 430, according to another embodiment of the present invention. SAS expander 430 is shown as includes a SAS master 425 and a multitude of SAS slaves 421, 422, 423, and 424. As noted in FIG. 4, SAS slaves 421-424 are non-self-configuring and do not configure route entries for themselves. SAS master 425 performs configuration functions on itself and the slave expanders. In FIG. 4, reference numeral ×1 indicates one SAS link, and reference numeral ×N indicates N SAS links, where N is an integer.

SAS switch 430 is shown as having four wide ports, 431, 432, 433, and 434. The first wide port 431 is shown as including four SAS links coupled to a first initiator device HBA 401. The second wide port 432 is shown as including four SAS links coupled to a second initiator device HBA 402. The third wide port 433 is shown as including four SAS links coupled to a first JBOD 408 (target SAS devices installed in the JBOD are not shown). The fourth wide port 434 is shown as including four SAS links coupled to a second JBOD 409 (target SAS devices installed in the JBOD are not shown).

The master and slave expanders have different SAS addresses. The PHYs from the four SAS slaves 421-424 are combined together into ×4 wide ports 431-434 for connecting to the external SAS devices. In this example, each PHY is from a different SAS slave. SAS master 425 is connected to each slave expander using a ×N wide port in a fan-out topology, where N is an integer determined according to the remaining PHYs on each SAS slave not used in the external wide ports. In one example, SAS switch 400 may be implemented using PMC Sierra's SXP 68×12G devices as SAS slave expanders and PMC Sierra's SXP 36×12G as SAS master expander. The SAS switch has 60 external ×4 ports, and the internal wide port can have a width N=8 (68−60=8). Note that only four ×4 wide ports are shown in FIG. 4, two for HBA and two for JBOD. More wide ports are not shown in the figure for clarity. In embodiments of the invention, the HBA to JBOD connection ratio is flexible.

The SAS slaves send their IDENTIFY address frames using the SAS master SAS address and a globally indexed logical expander PHY ID. Therefore, the external devices, such as the HBA or JBOD, receive IDENTIFY address frames from the SAS slaves with an identical SAS address and treats the ×4 port (including PHYs from 4 different slave expanders) as a wide port. In an embodiment, multiple SAS slaves provide high port count SAS connectivity and are not visible to external SAS devices. Each SAS slave's physical PHYs are mapped to a range of globally indexed logical expander PHY IDs within the SAS switch. All logical expander PHYs from four SAS slaves form the complete logical PHY map of the logical expander. The scfg SAS master is visible to external SAS devices, (HBA/JBOD), and manages the internal connected nscfg SAS slaves. The scfg SAS master firmware virtualizes the high port count logical expander to the external devices by responding to SMP/SMP commands. External management traffic (SMP/SSP between HBA and SAS switch) is routed by the nscfg SAS slaves to the scfg SAS master. Normal SAS data traffic (SSP/STP/SMP between HBA and JBOD) is routed by the SAS slave, only in one hop within the SAS switch, and the scfg SAS master is not involved. Link fail-over traffic is routed through nscfg SAS slaves and the scfg SAS master. Moreover, virtual SSP/SES is handled in the scfg SAS master.

In an embodiment, each nscfg expander transmits IDENTIFY address frames with its own SAS address on the links connected to the scfg expander, and the scfg expander manages the nscfg expanders through the internally connected SAS wide ports. The nscfg expander external PHY change events are notified to the scfg expander via BC primitives, which trigger scfg expander to perform a discovery process. During the scfg expander discovery process, the scfg expander saves the nscfg expander PHY information in local data base, and the scfg expander discovers the external topology (if required) and configures route entries for the nscfg expanders. The scfg expander configures the nscfg route entries for the scfg expander virtual SSP target. The scfg expander configures local route entries for the external discovery SMP requests when necessary, and removes the route entry when it is completed to avoid multi-path routing. The scfg expander polls real time information, such as PHY error count, etc., in nscfg expanders at certain intervals and saves it in local data base. The scfg expander firmware virtualizes the single cohesive expander by responding to external SMP commands using the local data base information and forwarding SMP commands(such as PHY reset) to mapped nscfg expanders. The logical PHY mapping is used to map the SMP command to appropriate physical nscfg expanders and PHYs. The scfg expander configures zoning for nscfg expanders, and the zone configuration is identical in each of the nscfg expander. Embodiments of the invention also include private or customized SMP/SSP commands for more efficient scfg/nscfg (or master/slave) expander communication.

Figure 5:
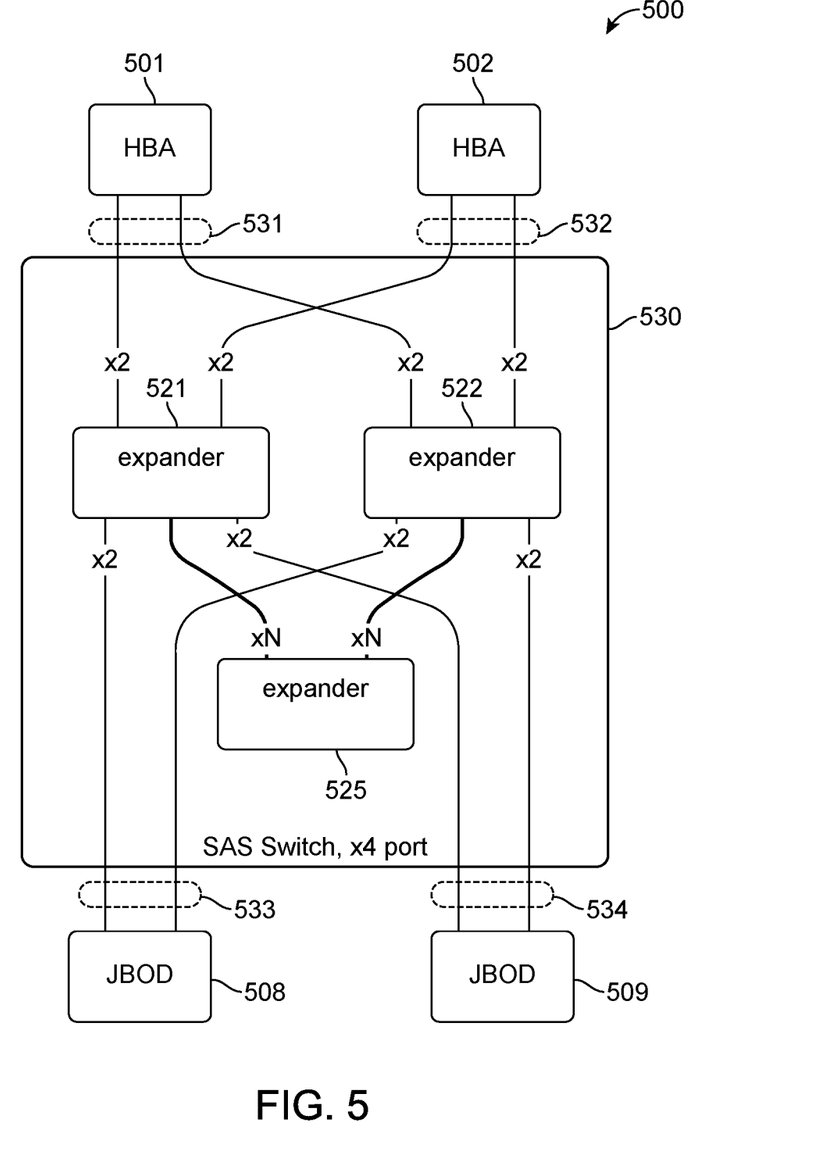
FIG. 5 is a simplified block diagram illustrating a system including a single cohesive SAS expander according to an alternative embodiment of the present invention.

FIG. 5 is a simplified block diagram illustrating a system 550 including a single cohesive SAS expander according to an alternative embodiment of the present invention. As shown in FIG. 5, a single cohesive SAS expander, or SAS switch, 530, includes a SAS master 525 and a multitude of SAS slaves 521, 522, 523, and 524. Single cohesive SAS expander, or SAS switch 530, has a similar configuration as SAS switch 1030 illustrated in FIG. 2. As noted in FIG. 5, SAS slaves are non-self-configuring (nscfg). They do not perform configuration functions for themselves. SAS master 525 is self-configuring and is labeled scfg. SAS master 525 performs configuration functions for itself and the SAS slaves. SAS switch 530 has four wide ports, 531, 532, 533, and 534. In FIG. 5, reference numeral ×2 means two SAS links, and reference numeral ×N means N SAS links, where N is an integer. The first wide port 531 includes four SAS links coupled to a first initiation device, HBA 501, and the second wide port 532 includes four SAS links coupled to a second initiation device, HBA 502. The third wide port 533 includes four SAS links coupled to a first target SAS device JBOD 508, and the fourth wide port 534 includes four SAS links coupled to a second target SAS device JBOD 509.

In an embodiment, SAS switch 530 in FIG. 5 includes four ports with lower port counts, with two PMC Sierra's SXP68×12G expanders as nscfg SAS slaves, and one PMC Seirra's SXP24×12G expander as the scfg SAS master. Two PHYs from each of the two nscfg expanders are combined together into a four link wide port. Note ports 531 and 532 can be considered a first ×4 wide port, and port 533 and port 534 can be considered a second ×4 wide port. Using the above expander devices, a total of 30 external ×4 ports can be provided, and the nscfg SAS slave to scfg SAS master port width is eight.

Figure 6:
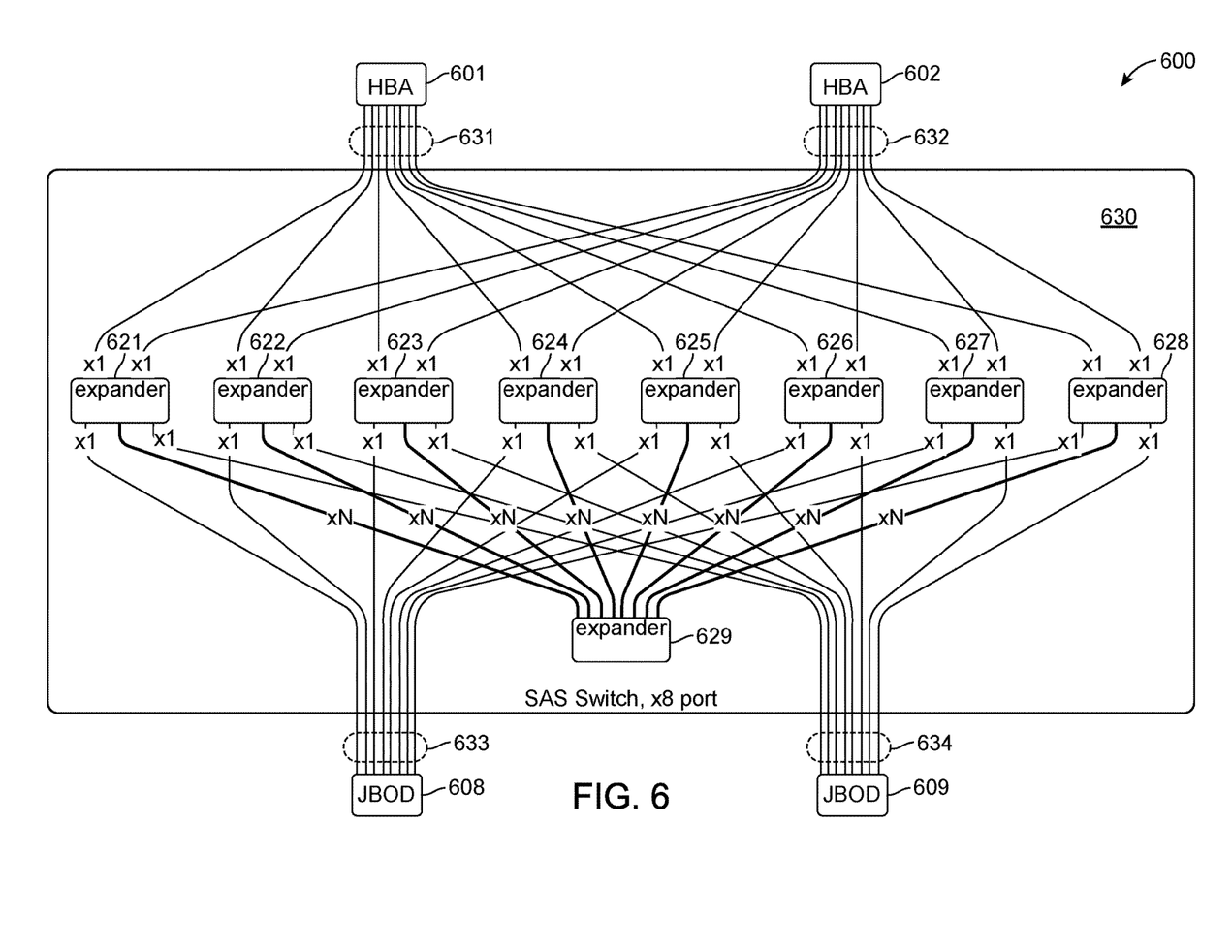
FIG. 6 is a simplified block diagram illustrating a system including a single cohesive
SAS expander according to yet another embodiment of the present invention.

FIG. 6 is a simplified block diagram illustrating a system 600 including a single cohesive SAS expander according to yet another embodiment of the present invention. As shown in FIG. 6, a single cohesive SAS expander, or SAS switch, 630, includes a SAS master 629 and a multitude of SAS slaves 621, 622, . . . , 627, and 628. Single cohesive SAS expander, or SAS switch, 630 has a similar configuration as SAS switch 1030 illustrated in FIG. 2. As noted in FIG. 6, SAS slaves are non-self-configuring (nscfg). They do not perform configuration functions for themselves. SAS master 629 is self-configuring and is labeled scfg. SAS master 625 performs configuration functions for itself and the SAS slaves. SAS switch 630 has four wide ports, 631, 632, 633, and 634. The first wide port 631 includes eight SAS links coupled to a first initiation device, HBA 601, and the second wide port 632 includes eight SAS links coupled to a second initiation device, HBA 602. The third wide port 433 includes eight SAS links coupled to a first target SAS device JBOD 608, and the fourth wide port 434 includes eight SAS links coupled to a second target SAS device JBOD 609. In FIG. 6, reference numeral ×1 indicates one SAS link, and reference numeral ×N indicates N SAS links, where N is an integer.

In an embodiment, SAS switch 630 in FIG. 6 can be implemented using eight PMC Sierra's SXP36×12G expanders as nscfg SAS slaves and one PMC Seirra's SXP48×12G expander as the scfg SAS master. One PHY from each of the eight nscfg expanders are combined together into an eight link wide port. Using the above expander devices, a total of 30 external ×8 ports can be provided, and the nscfg SAS slave to scfg SAS master port width is six, i.e., N=6.

Figure 7:
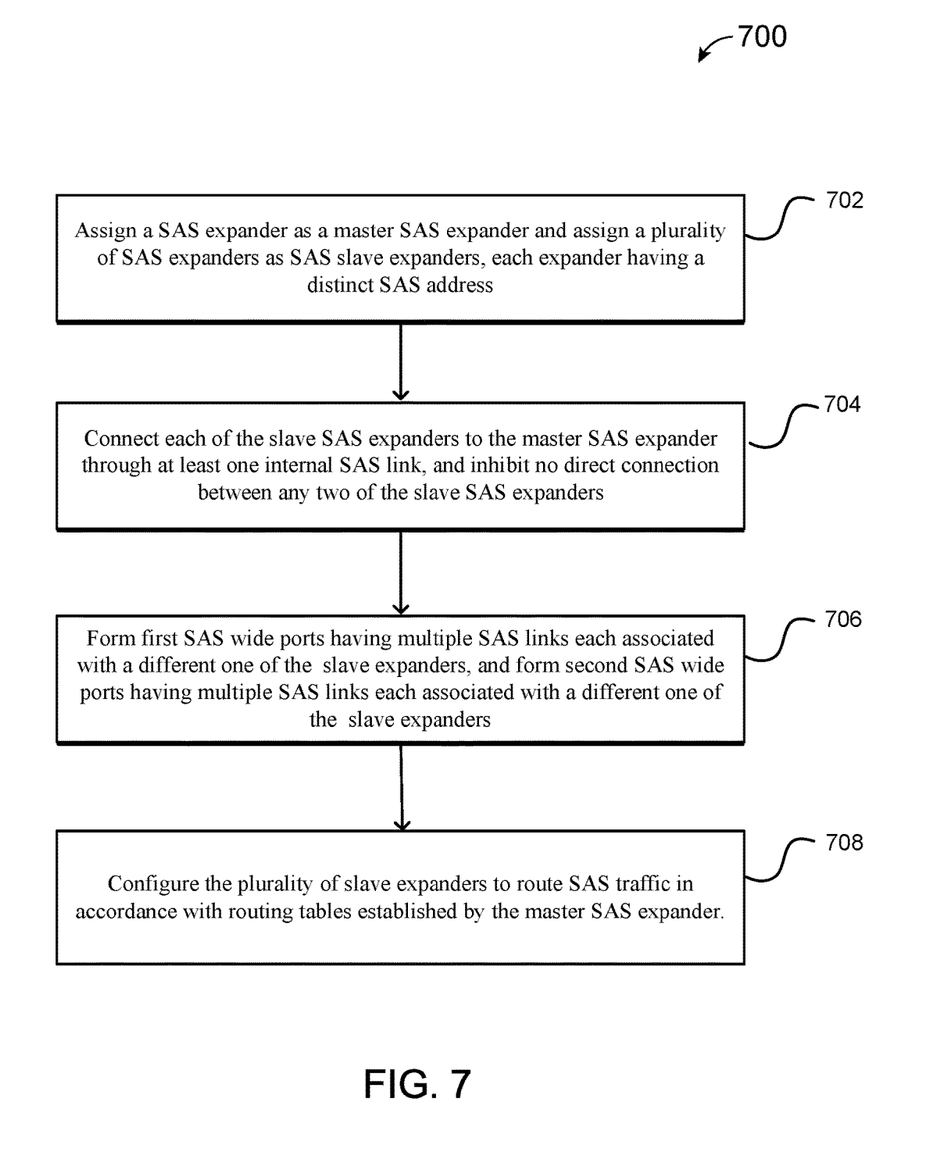
FIG. 7 is a flow chart illustrating a method for forming a single cohesive SAS expander from multiple expanders according to an embodiment of the present invention.

FIG. 7 is a flow chart 700 for forming a single cohesive SAS expander from multiple expanders according to an embodiment of the present invention. As shown at 702, a master SAS expander and a multitude of slave SAS expanders are identified. Each expander has a distinct SAS address. The same type of expanders can be used as the SAS master or the SAS slaves. Alternatively, a different type of expander can be used as the SAS master, e.g., depending on the available links of each expander and the internal topology of the SAS switch. At 704, each of the slave SAS expanders is connected to the master SAS expander through at least one internal SAS link and no direct connection is formed between any two of the slave SAS expanders. An example of the connection is shown in SAS switch in FIG. 2, where the internal links are shown as 1020-1023. The method also includes, at 706, forming at least one wide port for connecting to an external device by connecting at least one PHY on a first one of the slave SAS expanders with at least one PHY on a different one of the slave SAS expanders. For example, in FIG. 2, wide port 1031 includes links 1010-1013 from SAS slaves 1000-1003. Further, at 708, the plurality of slave expanders is configured to route SAS traffic in accordance with routing tables established by the master SAS expander. In some embodiments, the method also includes configuring the slave SAS expanders such that the IDENTIFY address frames sent to external SAS devices by the SAS slaves include a SAS ADDRESS field set to the master SAS expander's SAS address and a PHY IDENTIFIER field set to a PHY identifier that is uniquely indexed within the single coherent SAS expander. Thus, method 700 enables grouping a number of SAS expander together to provide a solution for a high port count SAS expander, while remaining a simple integrated external management interface and similar switching performance as a single cohesive SAS expander.

Figure 8:
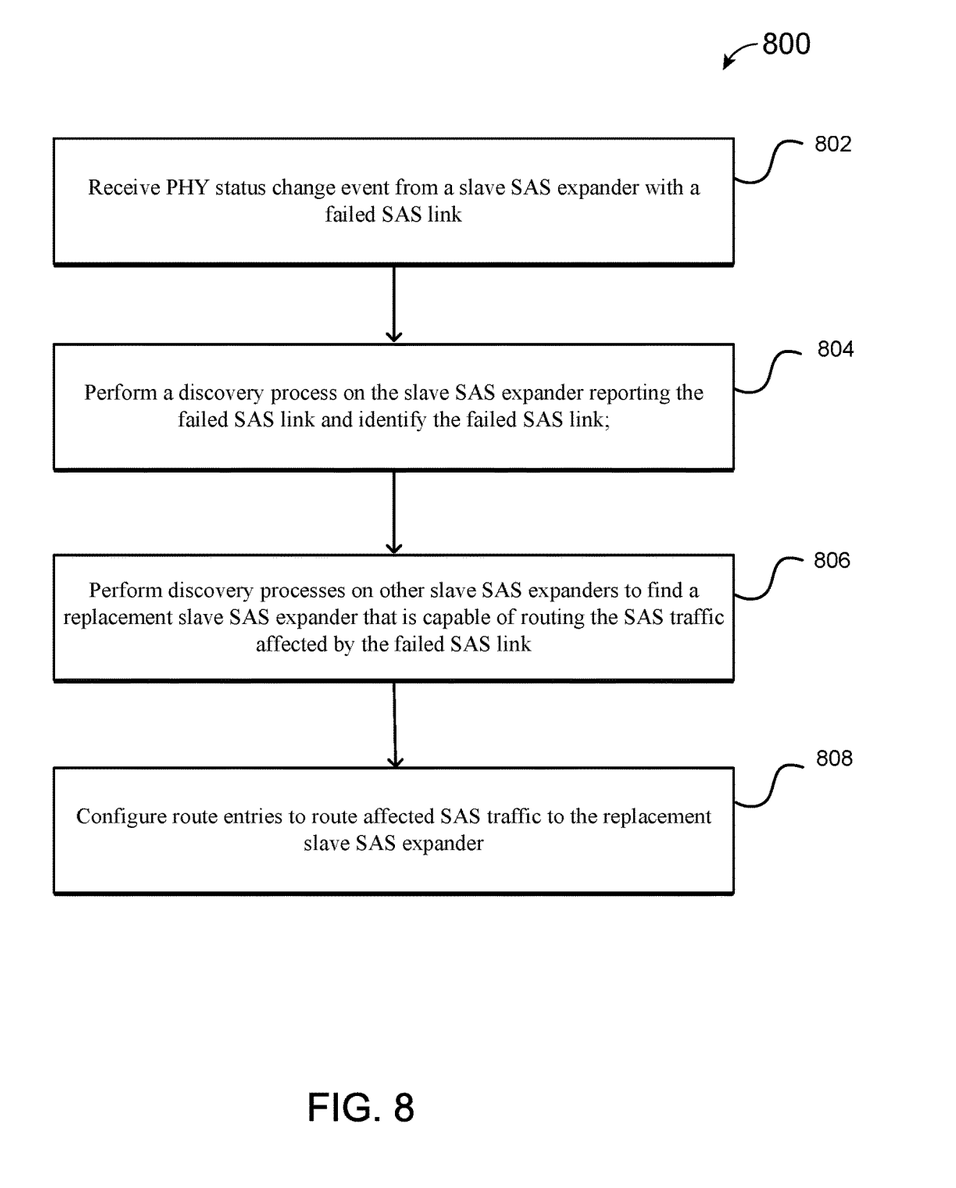
FIG. 8 is a flow chart illustrating a method for creating a SAS fail-over SAS handling in a single cohesive SAS expander according to an embodiment of the present invention.

FIG. 8 is a flowchart 800 for creating a fail-over SAS path in a single cohesive SAS expander including a SAS master and a multitude of SAS slaves according to an embodiment of the present invention. Method 800 in FIG. 8 is described below with reference to storage system 300 in FIG. 3. The method includes, at 802, a SAS slave 321 with a failure SAS link (link 314) reporting PHY status change event to SAS master 325 (expander scfg), for example, via BROADCAST (Change) primitive. At 804, SAS master 325 then performs a discovery with the SAS slave 321 with the failure SAS link and detecting the failure external SAS link 314. At 806, the SAS master performs further discoveries with other SAS slaves to find a replacement SAS slave, e.g., SAS slave 322 (expander nscfg B) that can route the SAS traffic affected by the failure external SAS link. At 808, having identified a replacement SAS expander, the SAS master configures local route entries to route the affected SAS traffic to the replacement SAS slave.

Various embodiments of the present invention can be implemented in the form of logic in software or hardware or a combination of both. The logic may be stored in a non-transitory computer readable or machine-readable storage medium as a set of instructions adapted to direct a processor of a computer system to perform a set of steps disclosed in embodiments of the present invention. The logic may form part of a computer program product adapted to direct an information-processing device to perform a set of steps disclosed in embodiments of the present invention. Based on the disclosure and teachings provided herein, a person of ordinary skill in the art will appreciate other ways and/or methods to implement the present invention.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method of managing an IDENTIFY address frame, the method comprising:
   in an SAS (Serial Attached Small Computer System Interface) switch having a master SAS expander and a plurality of slave SAS expanders, the master SAS expander characterized by a master SAS expander SAS address, configuring a routing table for each of the plurality of slave SAS expanders such that, in an SAS link identification sequence, a selected slave SAS expander in the plurality of slave SAS expanders is configured to:
   receive the master SAS expander SAS address, the master SAS expander SAS address being different from an SAS address of the selected slave SAS expander; and
   send, to another SAS device, the IDENTIFY address frame having the master SAS expander SAS address and a PHY identifier of the selected slave SAS expander.

2. The method of claim 1, wherein the selected slave SAS expander in the plurality of slave SAS expanders is further configured to:
   receive the master SAS expander SAS address from a first SAS link of the selected slave SAS expander; and
   send the IDENTIFY address frame to a second SAS link of the selected slave SAS expander.

3. A non-transitory computer-readable medium storing statements and instructions for execution by a processor to perform a method of managing an IDENTIFY address frame, the method comprising:
   in an SAS (Serial Attached Small Computer System Interface) switch having a master SAS expander and a plurality of slave SAS expanders, the master SAS expander characterized by a master SAS expander SAS address, configuring a routing table for each of the plurality of slave SAS expanders such that, in a SAS link identification sequence, a selected slave SAS expander in the plurality of slave SAS expanders is configured to:
   receive the master SAS expander SAS address, the master SAS expander SAS address being different from an SAS address of the selected slave SAS expander; and
   send, to another SAS device, the IDENTIFY address frame having the master SAS expander SAS address and a PHY identifier of the selected slave SAS expander.

4. The non-transitory computer-readable medium of claim 3, wherein the selected slave SAS expander in the plurality of slave SAS expanders is further configured to:
   receive the master SAS expander SAS address from a first SAS link of the selected slave SAS expander; and
   send the IDENTIFY address frame to a second SAS link of the selected slave SAS expander.

5. A master SAS (Serial Attached Small Computer System Interface) expander comprising:
   a processor; and
   a memory storing statements and instructions for execution by the processor to manage an IDENTIFY address frame, which cause the processor to:
   in an SAS switch having the master SAS expander in communication with a plurality of slave SAS expanders, the master SAS expander characterized by a master SAS expander SAS address, configure a routing table for each of the plurality of slave SAS expanders such that, in an SAS link identification sequence, a selected slave SAS expander in the plurality of slave SAS expanders is configured to:
   receive the master SAS expander SAS address, the master SAS expander SAS address being different from an SAS address of the selected slave SAS expander; and
   send, to another SAS device, the IDENTIFY address frame having the master SAS expander SAS address and a PHY identifier of the selected slave SAS expander.

6. The device of claim 5 wherein the selected slave SAS expander in the plurality of slave SAS expanders is further configured to:
   receive the master SAS expander SAS address from a first SAS link of the selected SAS expander; and
   send the IDENTIFY address frame to a second SAS link of the selected slave SAS expander.

* * * * *